J. F. O'CONNOR.
FRICTION GEAR.
APPLICATION FILED FEB. 6, 1915.
1,219,851.
Patented Mar. 20, 1917.
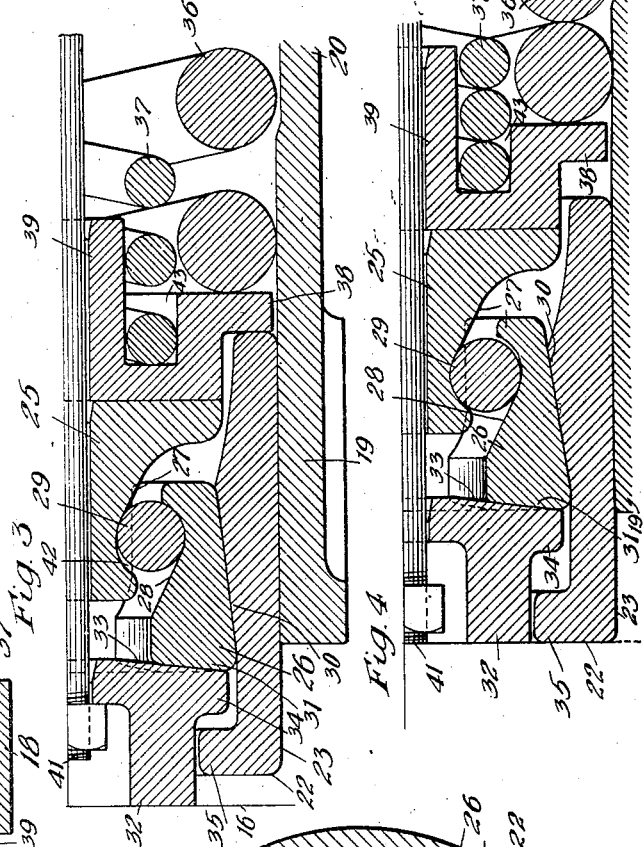
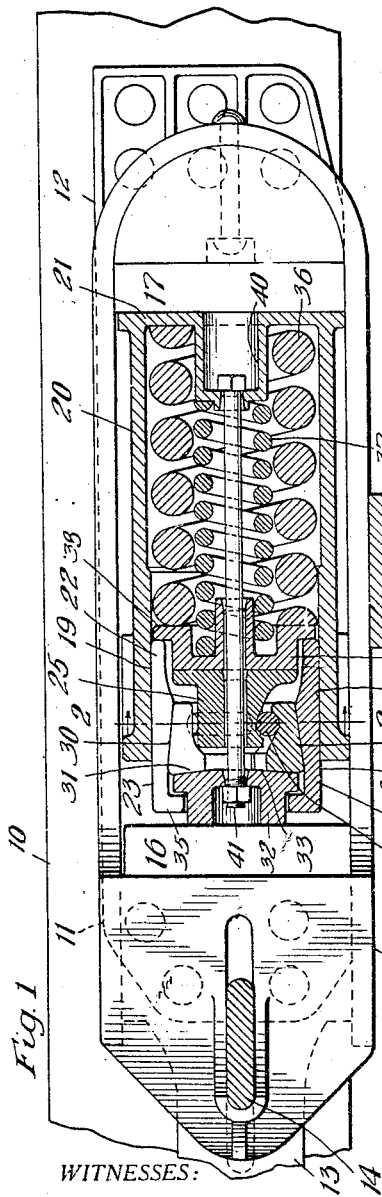
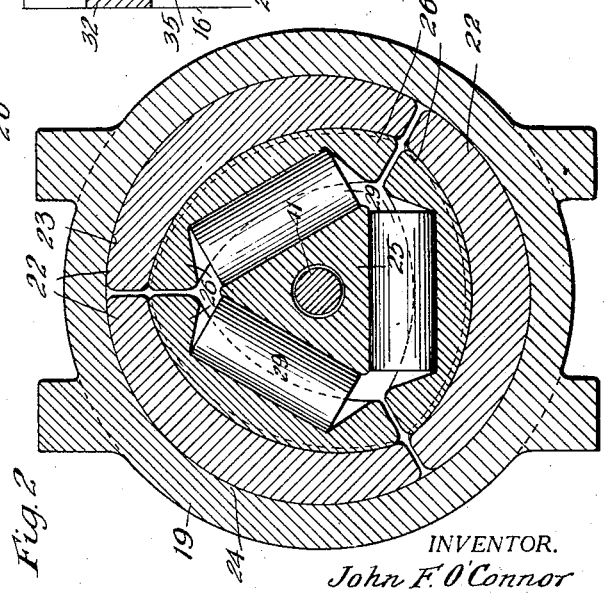
INVENTOR.
John F. O'Connor
BY George T. Haight
his ATTORNEY
WITNESSES:

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION-GEAR.

1,219,851.   Specification of Letters Patent.   Patented Mar. 20, 1917.

Application filed February 6, 1915. Serial No. 6,410.

*To all whom it may concern:*

Be it known that I, JOHN F. O'CONNOR, a citizen of the United States, residing at Chicago, in the county of Cook and State of Illinois, have invented a certain new and useful Improvement in Friction-Gears, of which the following is a full, clear, concise, and exact description, reference being had to the accompanying drawings, forming a part of this specification.

This invention relates to improvements in friction gears.

An object of the invention is to provide a high capacity friction gear for railway car draft riggings and one in which the release is always positive.

Another object of the invention is to provide a friction gear for railway draft riggings employing wedging or spreading means consisting of a main wedge or spreader and auxiliary wedges or spreaders interposed between the main wedge and the friction shoes.

The invention furthermore consists in the improvements in the parts and devices and in the novel combinations of the parts and devices, as herein shown, described or claimed.

In the drawing forming a part of this specification, Figure 1 is a longitudinal vertical section of a draft rigging showing one form of my improvements, the parts being in full release. Fig. 2 is an enlarged vertical sectional view taken substantially on the line 2—2 of Fig. 1 and Figs. 3 and 4 are vertical sectional views, upon an enlarged scale, of the front end of the friction gear proper and illustrating the parts under full release and full buff respectively.

In said drawing, 10 denotes the center sill or other draft member to which are secured the usual front and rear stops 11 and 12. The draw-bar 13 is or may be of any well known construction, and as shown, is connected by a coupler key 14 with a yoke 15 which encircles the gear proper, hereinafter described, and the front follower 16 and rear follower 17. All the parts are supported by a saddle plate 18.

The gear proper, as shown, comprises a combined friction shell 19 and spring casing 20, the latter having an integral rear wall 21. Mounted within the friction cylinder are the friction shoes 22, the same being circularly arranged and comprising three in number, each shoe having a cylindrical outer surface 23 in engagement with the corresponding inner friction surface 24 of the cylinder, the outer friction surfaces of the shoes and the friction surface of the cylinder being struck on a radius having its center coincident with the center of the cylinder. Mounted within the friction shoes 22, is the wedging or spreading means which, as shown, comprises a main wedge or spreader 25 and a series of auxiliary wedges or spreaders 26, the latter corresponding in number and arrangement to the friction shoes 22. As will be understood, the main wedge 25 has as many inclined wedging faces 27 as there are auxiliary wedges 26 and interposed between each inclined face 27 and the corresponding inner inclined face 28 of an auxiliary wedge, is an antifriction roller 29. The outer faces of each of the auxiliary wedges 26 are cylindrical and are also inclined inwardly. The friction shoes 22, on their inner faces, are also provided with inwardly inclined cylindrical surfaces 30 coöperable with the outer surfaces of the auxiliary wedges 26. The inner surfaces 30 of the friction shoes and the outer surfaces of the auxiliary wedges 26 are struck on the same length radii as are the surfaces 23 and 24 but the centers of said radii are off-set from the true center of the cylinder with the result that the longitudinal edges of the friction shoes will be narrower than at the center as clearly appears from Fig. 2. By this arrangement, the auxiliary wedges 26 will be prevented from becoming displaced circumferentially relative to the friction shoes. The outer ends of the friction shoes 22 are normally spaced from the front follower 16 a short distance, approximately ¾" or ½" and interposed between the follower 16 and the outer inclined ends 31—31 of the auxiliary wedges 26 is a block 32 the inner face of which is also inclined as indicated at 33. Said block 32 is also provided with a circumferential flange 34 which extends beneath inwardly turned flanges 35 on the outer ends of the friction shoes. Within the casing 20 is mounted a spring which, in the form shown, comprises an outer coil 36 and an inner coil 37. The outer coil has its inner end bearing upon the wall 21 and its outer end on the flange 38 of a spring cap or follower 39. The inner coil 37 has its inner end bearing upon an inwardly extended, hollow perforated boss 40 formed integral with the rear wall 21 and the forward end of the spring 37 bears upon said follower 39 within an annular recess 43 formed therein. A connecting bolt 41 is extended through the boss 40, follower 39, main wedge 25 and block 32 and is adapted not only to hold the parts in assembled relation but also to maintain the spring under initial compression.

The normal position of the parts is as shown most clearly in Figs. 1 and 3 and in the first action of the gear, say under buff, the front follower 16 is moved inwardly by the draw-bar and the first action which takes place is the inward movement of the block 32 and the inward movement of the wedging or spreading means which includes the auxiliary wedges 26 and main wedge 25. During this initial action the friction shoes 22 remain stationary, due to the friction between their outer surfaces and the cylinder. Inward movement of the block 32 and the wedging means, is of course, resisted by the spring which acts directly upon the main wedge through the intermediary of the spring follower 39. During this initial action, the auxiliary wedges 26 not only move inwardly or longitudinally relatively to the entire draft rigging, that is, parallel with the center line of the gear, but they are also moved radially of the cylinder or inwardly toward the axis thereof, due to the fact that they are traveling along the inclined surface 30 on the inner faces of the friction shoes. At the same time, said auxiliary wedges 26 are traveling down the inclined faces 33 on the inner end of the block 32. As a result of the longitudinal and transverse movement of the auxiliary wedges 26, the main wedge 25 will have a longitudinal or lineal travel which is faster than that of either the follower 16 or the block 32. In other words, the main wedge 25 must travel faster than the auxiliary wedges 26 and in order to provide for this action, a space or clearance indicated at 42 is left between each of the anti-friction rollers 29 and the main wedge 25 (see Fig. 3). After the movement above described has taken place the follower 16 will finally engage the outer ends of the friction shoes 22 and thereafter the block 32, friction shoes 22 and auxiliary wedges 26 will travel as a unit and the friction between the shoes and the cylinder will be gradually augmented by the main spring acting through the main wedge until the parts will assume the position in full buff shown in Fig. 4. On release, the friction shoes will remain stationary during the initial movements and the main wedge, auxiliary wedges and block 32 will be forced outwardly by the main spring until the flange 38 of the spring follower engages the inner ends of the friction shoes whereupon the main wedge, auxiliary wedges, block 32, and shoes 22 will move out together to the full release position. As will be apparent, under the releasing action, the outward movement of the auxiliary wedges 26 is greatly facilitated on account of the outward taper or inclination of the surfaces 30 on the inner sides of the friction shoes which permits the auxiliary wedges 26 to separate or loosen very readily.

From the preceding description it will be seen that the friction gear which I have provided is of very high capacity, the release is certain, and the parts are so arranged that the load on the main wedge is always limited to the pressure of the main spring, an important consideration in this type of gears.

Although I have herein shown and described what I now consider the preferred embodiment of my invention, it will be understood that changes and modifications may be made in the details and arrangement of parts and I contemplate all changes and modifications that come within the scope of the claims appended hereto.

I claim:—

1. In a draft rigging for railway cars, a friction gear comprising a friction shell, friction shoes coöperable therewith, auxiliary wedges coöperable with the friction shoes and slidable relatively thereto during initial portions of thrust and release, the engaging faces of said shoes and auxiliary wedges being inclined inwardly toward the axis of the shell, a main wedge, and spring means resisting movement of said shoes and wedges.

2. In a draft rigging for railway cars, a friction gear comprising in combination a friction shell, friction shoes coöperable therewith, auxiliary wedges coöperable with the friction shoes and movable separately thereof during initial portions of thrust and release, the engaging faces of said shoes and auxiliary wedges being inwardly inclined toward the center line of the gear, a main wedge coöperable with said auxiliary wedges, and spring means resisting movement of said shoes and wedges, said spring means acting directly through the wedges to the friction shoes.

3. A friction gear for railway car draft riggings comprising, in combination: a friction shell, friction shoes coöperable therewith, main and auxiliary wedges, and a spring, the main and auxiliary wedges moving during portions of the impact and release movements while the frictions shoes remain stationary after which the shoes move simultaneously with the wedges, the auxiliary wedges engaging the inner sides of the friction shoes and being movable longitudinally and radially thereof when the friction shoes are stationary.

4. A friction gear for railway car draft riggings comprising, a friction shell, a main wedge, a spring, friction shoes coöperable with said shell, and a set of auxiliary wedges coöperable with and engaging said friction shoes, the engaging surfaces of said shoes and auxiliary wedges being inclined relatively to the center line of the gear and said main wedge acting directly against said spring.

5. A friction gear for railway car draft riggings comprising, a friction shell, a main wedge, a spring, friction shoes coöperable with said shell, a set of auxiliary wedges coöperable with the inner surfaces of said friction shoes, and means for producing relative longitudinal and radial movement between the auxiliary wedges and the friction shoes during part only of the impact and releasing movements of the gear.

6. A friction gear for railway car draft riggings comprising, a friction shell, a spring, a main wedge, auxiliary wedges, and friction shoes, the friction shoes acting directly against the friction shell and the auxiliary wedges against the inner surfaces of the friction shoes, the inner surfaces of said friction shoes being inwardly inclined toward the center line of the gear, said friction shoes remaining stationary relatively to the shell during initial movements of the auxiliary wedges.

7. A friction gear for railway car draft riggings comprising, a friction shell, a main wedge, a main spring, a plurality of friction shoes coöperable with the friction shell, a plurality of auxiliary wedges interposed between the main wedge and the friction shoes, said friction shoes remaining stationary relative to the shell during initial action of buff and draft, a follower, and means for transmitting pressure from said follower first directly to the auxiliary set of wedges and finally directly to both said wedges and the friction shoes simultaneously, said means and said auxiliary wedges having engaging surfaces inclined to the axis of the gear.

8. A friction gear for railway car draft riggings comprising a friction shell, friction shoes coöperable with said shell, a set of auxiliary wedges slidable with respect to said shoes during portions of the actions of buff and draft and movable simultaneously with said shoes during the remaining portions of the actions under buff and draft, a main wedge, spring means directly resisting movement of said main wedge, and means for forcing said auxiliary wedges inwardly toward the center line of the gear when the same slide relatively to said friction shoes.

9. A friction gear for railway car draft riggings comprising, a friction shell, friction shoes coöperable with said shell, a main spring, wedge acting means between said spring and friction shoes, said means comprising a plurality of wedging members having anti-friction rollers therebetween, and inclined surfaces on the inner sides of the friction shoes coöperable with correspondingly inclined surfaces on the outer sides of some of said wedge members.

10. A friction gear for railway car draft riggings comprising, a friction shell, longitudinally movable friction shoes coöperable therewith, a main wedge, spring, front follower, auxiliary wedges, and a block interposed between said follower and the outer ends of the auxiliary wedges, said shoes and auxiliary wedges having inwardly inclined coöperable surfaces and said block and the ends of said auxiliary wedges having also inclined engaging surfaces whereby, upon longitudinal movement of said block relatively to the friction shoes, the auxiliary wedges are moved longitudinally at a faster rate than that of said block.

11. A friction gear for railway car draft riggings comprising, a friction shell, friction shoes, spring, a main wedge acting directly against said spring, auxiliary wedges, said shoes remaining stationary during initial portions of buff and draft and while the auxiliary wedges and main wedge are actuated, and means for imparting a faster lineal travel to the main wedge than that to the auxiliary wedges during said initial portions of the buffing and draft movements.

12. A friction draft gear for railway cars comprising, a friction shell having cylindrical inner friction surfaces, friction shoes having outer friction surfaces corresponding to the friction surfaces of said shell, a spring, and wedging means interposed between said spring and said shoes, said means including auxiliary wedges corresponding in number to the friction shoes and in engagement with the latter, the engaging surfaces of the auxiliary wedges and friction shoes being struck on radii having a different center than the center of the radii on which the friction surfaces are struck.

13. A friction gear for railway car draft riggings, comprising, a friction shell having inner cylindrical friction surfaces the center of curvature of which coincides with the axis of the cylinder, friction shoes having outer friction surfaces coöperable with the inner friction surface of the shell, spring, and wedging means interposed between the spring and shoes, said means including a set of auxiliary wedges, said auxiliary wedges and friction shoes having engaging surfaces inclined inwardly toward the axis of the gear, the centers of the radii on which said curved engaging surfaces between the shoes and auxiliary wedges are struck being each offset from the axis of the gear.

14. A friction gear for railway car draft riggings comprising a friction shell, friction shoes coöperable with said shell, a spring, a main wedge located within said shell and directly acted upon by said spring, a plurality of auxiliary wedges interposed between said main wedge and the friction shoes, anti-friction rollers interposed between said auxiliary wedges and the main wedge, the outer surfaces of the auxiliary wedges and inner faces of the friction shoes being inwardly inclined and the end faces of the auxiliary wedges being also inclined relatively to the center line of the gear.

15. A friction gear for railway car draft riggings comprising a friction shell, friction shoes coöperable therewith, a main wedge, auxiliary wedges interposed between the main wedge and said shoes and corresponding in number to the latter, and means for preventing relative circumferential displacement of the shoes and auxiliary wedges.

JOHN F. O'CONNOR.

Witnesses:
CARRIE G. RANZ,
GEORGIE VICKERY.